Feb. 28, 1933. R. D. EVANS ET AL 1,899,613
STABLE POWER SYSTEM WITH HIGH SPEED BREAKERS AND RELAYS
Filed Oct. 30, 1929 4 Sheets-Sheet 1
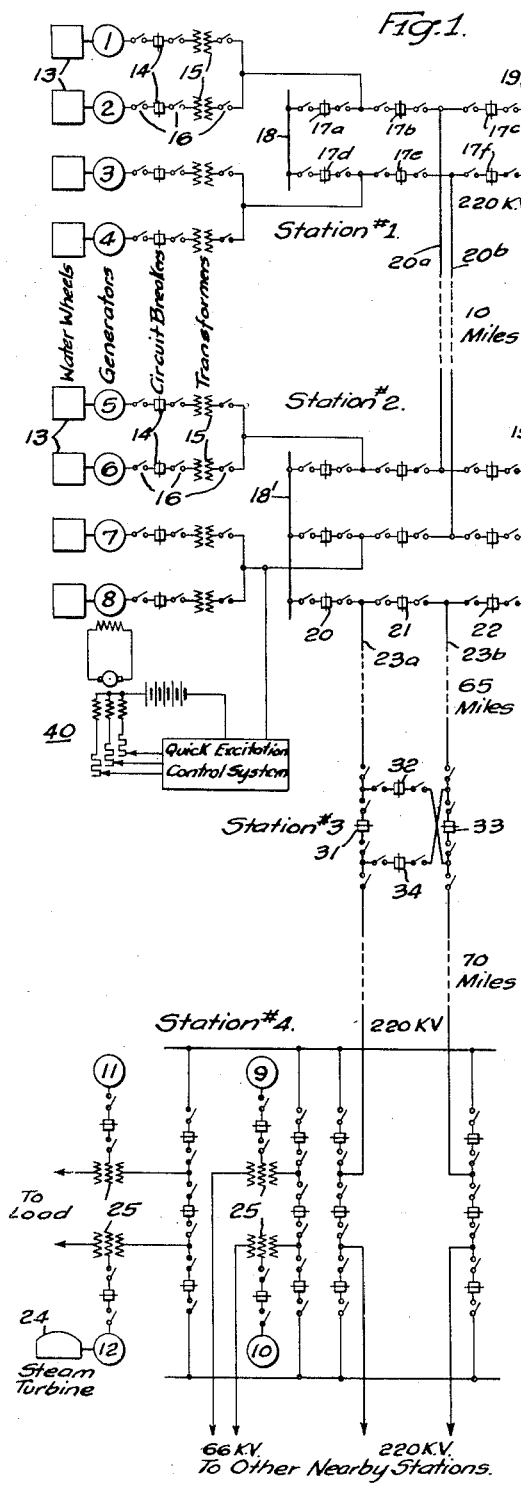
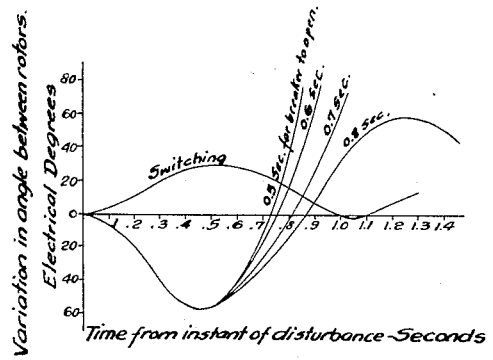
Fig. 2.
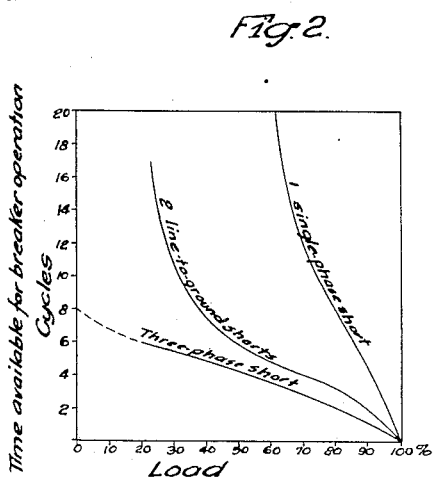
Fig. 3.
INVENTORS
Robert D. Evans, Charles LeG. Fortescue,
Leslie N. Crichton, John B. MacNeill,
Samuel B. Griscom and Charles F. Wagner
BY Wesley G. Carr
ATTORNEY

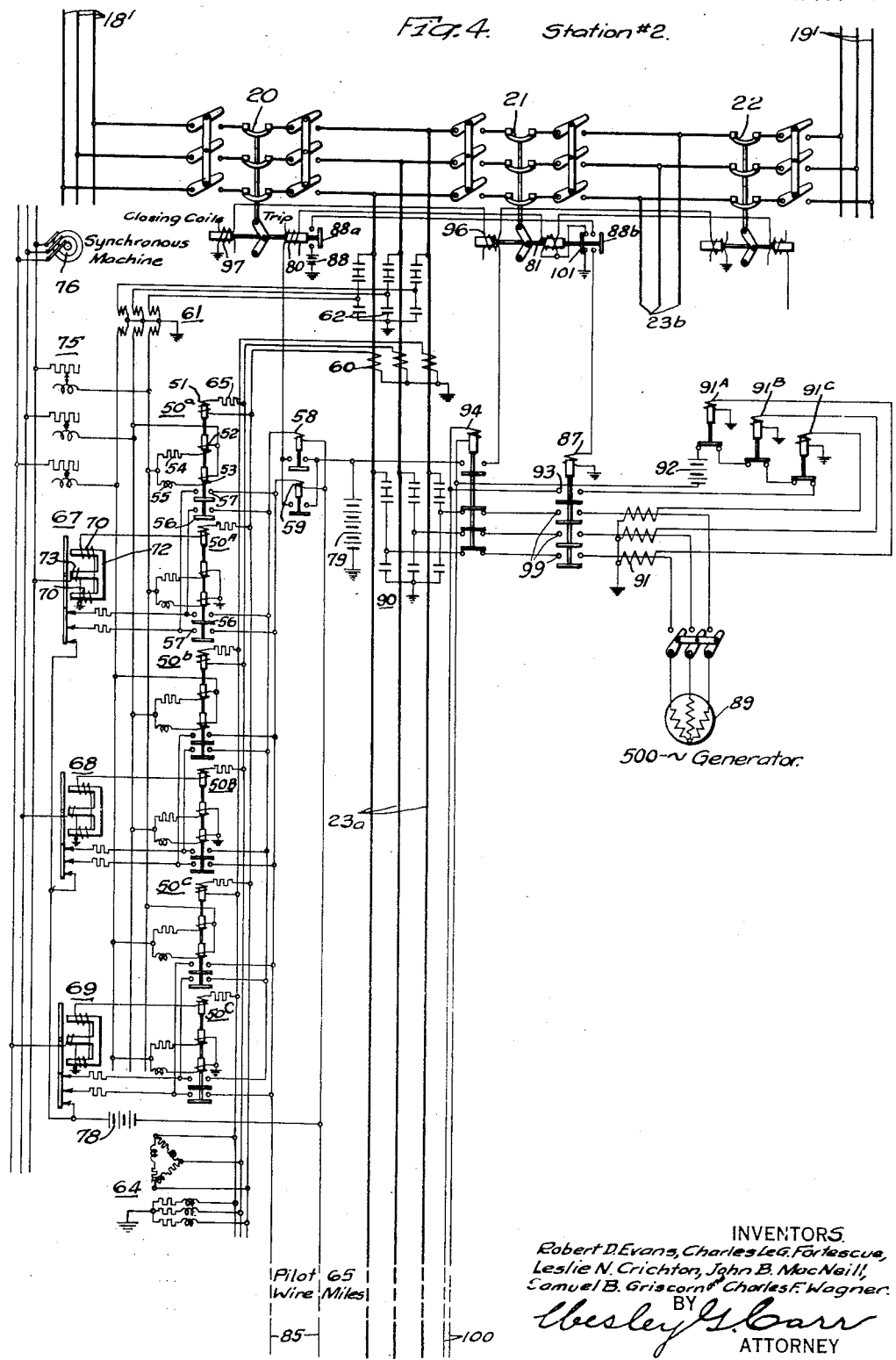

Feb. 28, 1933.  R. D. EVANS ET AL  1,899,613
STABLE POWER SYSTEM WITH HIGH SPEED BREAKERS AND RELAYS
Filed Oct. 30, 1929  4 Sheets-Sheet 3
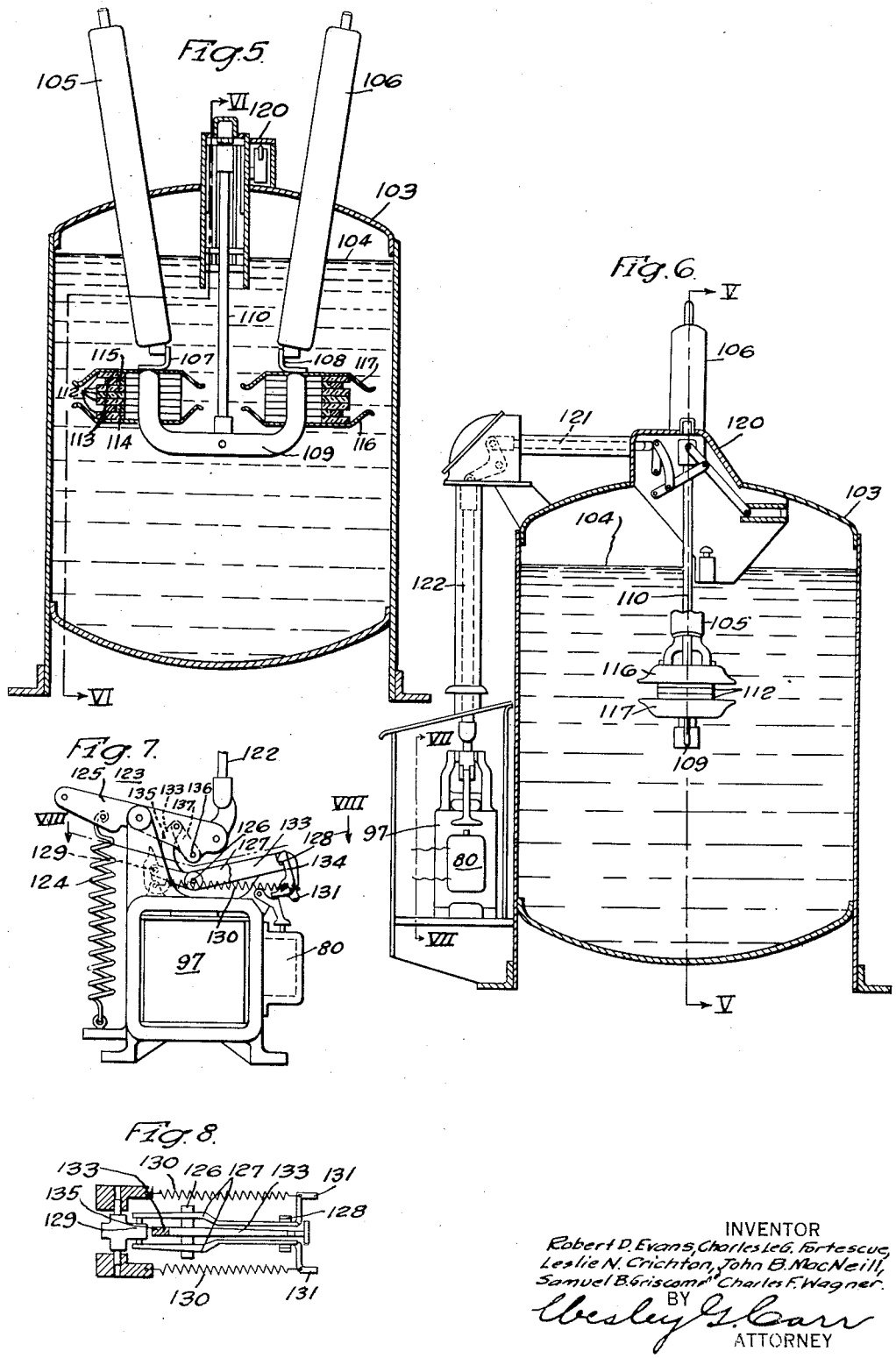
INVENTOR
Robert D. Evans, Charles Le G. Fortescue,
Leslie N. Crichton, John B. MacNeill,
Samuel B. Griscom & Charles F. Wagner.
BY
Wesley G. Carr
ATTORNEY

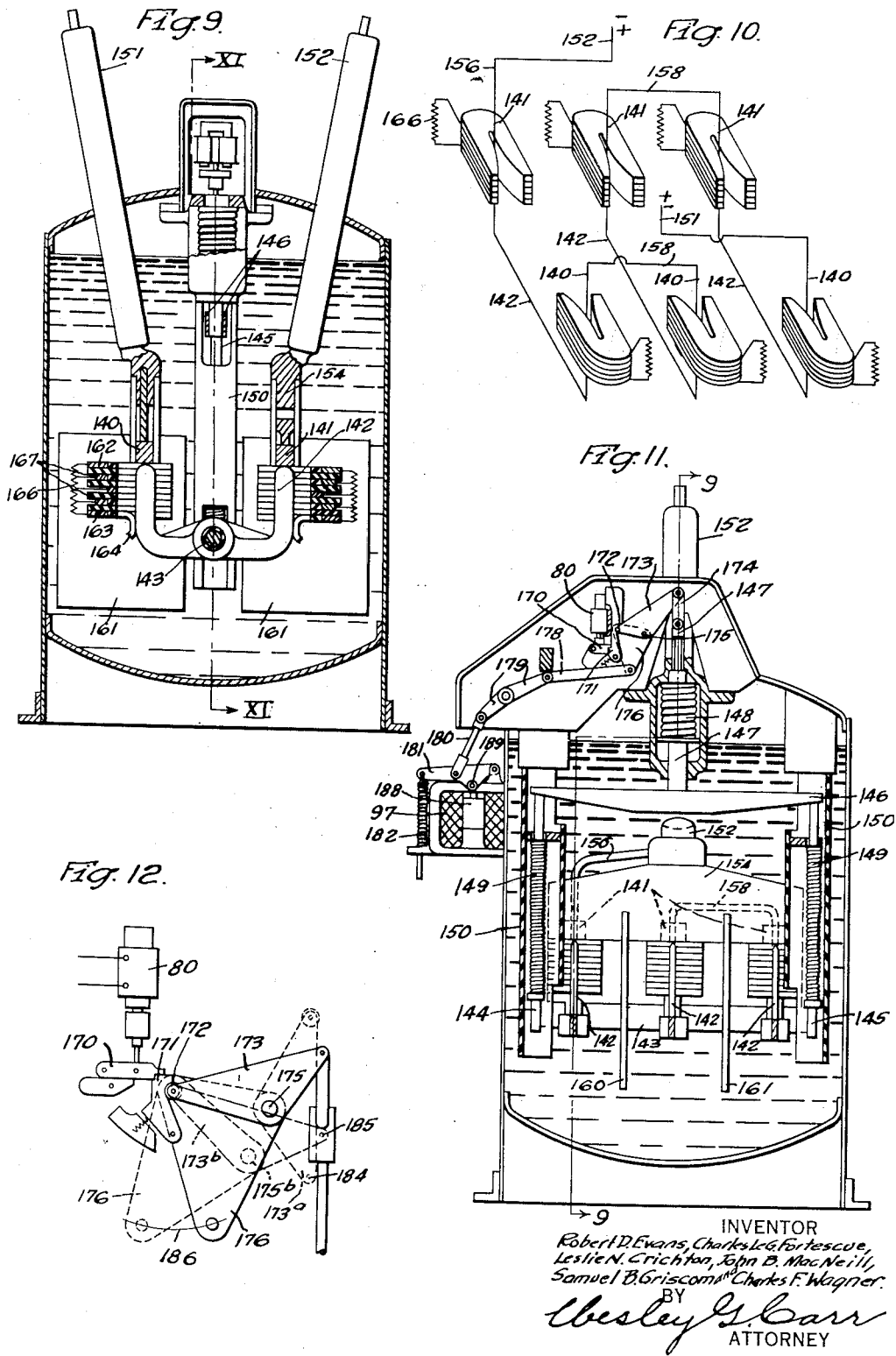

Patented Feb. 28, 1933

1,899,613

UNITED STATES PATENT OFFICE

ROBERT D. EVANS, OF SWISSVALE, AND CHARLES LE G. FORTESCUE, OF PITTSBURGH, PENNSYLVANIA, AND LESLIE N. CRICHTON, OF EAST ORANGE, NEW JERSEY, AND JOHN B. MacNEILL, OF WILKINSBURG, AND SAMUEL B. GRISCOM AND CHARLES F. WAGNER, OF SWISSVALE, PENNSYLVANIA, ASSIGNORS TO WESTINGHOUSE ELECTRIC AND MANUFACTURING COMPANY, A CORPORATION OF PENNSYLVANIA

STABLE POWER SYSTEM WITH HIGH-SPEED BREAKERS AND RELAYS

Application filed October 30, 1929. Serial No. 403,390.

Our invention relates to super-power polyphase transmission systems which utilize synchronous machines and in which stability problems are paramount in determining the loads which may be carried by the systems. More particularly, our invention relates to improved means for increasing the stability, the continuity of service and/or the power limits of such systems and for enabling them to withstand far more severe short-circuits than ever before, without loss of synchronism.

Heretofore, many attempts have been made to increase the power which may be transmitted over the high-voltage transmission lines, which have been constructed for carrying considerable blocks of power over considerable distances. The most significant advance-step which was made, along these lines, prior to our present invention, was the quick-response excitation system whereby a condition of artificial stability was set up within the synchronous machines by suitably changing the excitation voltages at a rate quicker than the rate at which the machines drifted out of step, as set forth in Patent No. 1,692,495, granted to R. D. Evans et al., November 20, 1928, on an application filed September 9, 1927.

The best that a quick-response excitation system could do, on many transmission lines, was to permit the transmission system to stand a single-phase short circuit, when the fault was cleared by the then conventional circuit breakers operating in something of the order of two-thirds of a second, or 40 cycles in a 60-cycle system, which, with the cascade breaker operation then in use, meant a time of 80 cycles necessary to isolate both ends of a faulty line-section. This time of circuit-breaker action caused the fault to be cleared after the first maximum phase-angle displacement of the two ends of the faulty section; and it not only represented just about the maximum speeds which could be attained in these high-voltage, high-power circuit breakers, in keeping with the long-established conventional designs of the art, but, since the aforesaid conventional circuit-breaker time was considerably longer than the time necessary for the system to swing to its maximum phase-angle displacement, after the occurrence of the fault, there was no incentive to undertake a costly circuit-breaker development which would reduce the time of operation of said breakers, because a reduction in the time would, in general, cause the system to lose synchronism by the overswing resulting from the interruption of the fault at a time slightly in excess of the first maximum swing of the phase-angle displacement, as will be hereinafter more fully explained. Reference is here made to circuit-breakers of high voltage rating, such as would be needed in a super-power system.

According to our present invention, we have found that if a fault is cleared in a sufficiently short time, for example in something of the order of the quarter of a second which was heretofore required by the quick-response excitation system to become effective, after the occurrence of a fault, the transmission system could be made to withstand not only the single-phase faults which the quick-excited system would stand, but also a double single-phase fault occurring simultaneously on two phases of the transmission line, and if the time of clearing the fault is made just a little quicker, even permitting the system to withstand a complete three-phase fault which causes the transmitted power to be reduced to zero for the duration of the fault, thus taking away all of the synchronizing power from the line during said period. No quick-response system with heretofore conventional breakers and relays could hope to cope with such a condition of three-phase short-circuit, because, regardless of the excitation of the synchronous machines at the two ends of a line, there would be no synchronizing force, because there was no power transmitted, during the continuance of a three-phase fault, and the ends of the line would drift far apart, beyond any possibility of recovery, before the fault was cleared.

In general, our quick-acting breaker and relay system for clearing a fault operates in such a short period of time that a quick-response excitation system does not have time to become really effective within the duration of a fault, although the quick-excitation system may have some benefit afterwards, in case of line faults, and is of decided advantage to take care of faulty operations of station attendants which may result in "pulling" the field of a heavily excited large synchronous machine at one end of the line, thereby necessitating a quick response of the exciters of the other machines on the line, in order to take up the necessary exciting kva.

With the foregoing and other objects in view, our invention consists in the systems and combinations hereinafter described and claimed, and illustrated in the accompanying drawings, wherein Figure 1 is a single-line diagram of an illustrative transmission-system layout embodying our invention, Figs. 2 and 3 are curve diagrams which will be referred to hereinafter.

Fig. 4 is a detail diagrammatic view showing the relaying and switching apparatus which is used in connection with one of the multiple-circuit lines at one of the stations of our illustrative system, Fig. 5 is a central longitudinal sectional view of a single pole-unit of one of the high-voltage circuit-breakers shown in Fig. 4, the section-plane being indicated by the line 5—5 in Fig. 6, Fig. 6 is a sectional view on the line 6—6 of Fig. 5, Fig. 7 is a detail of the solenoid mechanism of Fig. 6, approximately as would be seen from a section-plane 7—7 in Fig. 6, Fig. 8 is a sectional view on the line 8—8 of Fig. 7, Fig. 9 is a sectional view of a modified circuit-breaker construction, the section-plane being indicated by the line 9—9 in Fig. 11, Fig. 10 is a diagrammatic perspective view illustrating the circuit-connections of the circuit-breaker shown in Figs. 9 and 11, Fig. 11 is a sectional view on the line 11—11 of Fig. 9, and Fig. 12 is a detail view of the trip-free lever mechanism of Fig. 11.

In order that we may have something tangible to talk about, and may thus make ourselves clear, we shall describe our invention in its application to one particular transmission system, which is selected solely for purposes of illustration, and not as limiting our invention to that particular system. We shall attempt, as the description progresses, to explain the principles of our invention and to set forth its quantitative limits, both in respect to delimiting all circuit-breaker and relaying systems which may be designed to embody our present invention, and in respect to setting forth its contra-distinctions from the systems of the prior art.

In the super-power transmission system shown in Fig. 1, twelve synchronous machines, numbered 1 to 12, respectively, are illustrated, together with several substation equipments and transmission-line connections between the substations. There are two hydro-electric generating stations Nos. 1 and 2, located ten miles apart, each station having four 35,000-kw. 60-cycle 3-phase water-wheel generators 1 to 4 and 5 to 8, respectively, each driven by a water wheel indicated diagrammatically by a square marked 13. Each generator is protected by means of a circuit breaker 14 and is connected to a step-up transformer 15. Suitable disconnect switches are provided, as indicated at 16, in accordance with the usual practice in the art.

The eight water-wheel generators 1 to 8 are connected together in pairs, the connections being made on the high-voltage side of the step-up transformers 15, the voltage in this case being 220 kilo-volts.

The four generators at station No. 1 are connected, through normally closed bussing circuit breakers 17a to 17f, to two 220-kv. buses 18 and 19, respectively, which are also similarly connected to a two-circuit 10-mile transmission line 20a and 20b. The connections may be traced as follows: from bus 18 through circuit breaker 17a to the first two generators 1 and 2 and also to circuit breaker 17b; thence to transmission-line circuit 20a and to circuit breaker 17c which connects with the second bus 19. A second series of connections are provided, from bus 18 through circuit breaker 17d to the other two generators 3 and 4 and also to circuit breaker 17e; thence to transmission-line circuit 20b and to circuit breaker 17f which connects with the second bus 19.

The double-circuit transmission line 20a and 20b leads to the second generating station No. 2, where the above-described connections are duplicated, the buses being indicated, in this case, by the accented numerals 18' and 19', respectively. The buses 18' and 19' of the second station are further provided with an additional circuit-breaker connection comprising three circuit breakers 20, 21 and 22 which are serially connected between the two buses 18' and 19', respectively. Between the breakers 20 and 21, and between the breakers 21 and 22, are connected the respective terminals of a 135-mile, double-circuit, 220-kv., 60-cycle transmission line 23a and 23b, respectively, which leads, through a centrally-disposed switching station marked No. 3, to a receiving station marked No. 4, at which are located three synchronous condensers 9, 10 and 11 and a synchronous turbo-generator 12 driven by a steam turbine indicated diagrammatically at 24. The four synchronous machines 9 to 12 at station No. 4 are each connected to the tertiary winding of a 3-winding transformer 25, the primary windings of which are connected to the incoming 220-kv. transmission lines 23a and 23b, through suitable bussing circuit breakers, and the secondary windings of which are connected to various load circuits.

The sectionalizing station No. 3 is provided with four breakers 31 to 34, so arranged that the continuities of the lines 23a and 23b are interrupted, respectively, by the breakers 31 and 33. The side of the circuit breaker 31 which is nearest the generating station No. 2 is connected to the far side of breaker 33 by means of breaker 32, and the near side of breaker 33 is connected to the far side of breaker 31 by breaker 34. Thus, the opening of the two breakers 31 and 32, which are connected to the transmission line-section 23a from the generating station No. 2, will effectually isolate that end of said section in case of a fault thereon, permitting the power to be transmitted over the remaining section 23b from the generating station No. 2 to the switching station No. 3, and from both sections from the switching station No. 3 to the receiving station No. 4. In like manner, the simultaneous opening of the breakers 32 and 33 will disconnect the switching-station end of the section 23b which runs from the generating station No. 2. In like manner also, at the generating station, the opening of the breakers 20 and 21 will disconnect that end of the line-section 23a; and the opening of the breakers 21 and 22 will disconnect that end of the line-section 23b.

Each of the twelve synchronous machines 1 to 12, shown in Fig. 1, is preferably supplied with a quick-response excitation system in accordance with the Evans et al. Patent No. 1,692,495 hereinabove mentioned, as indicated, in connection with the generator 8, by the numeral 40. As the equipment is the same for each of the synchronous machines, it has not been deemed necessary to duplicate the same. While preferably all of the synchronous machines are equipped with quick-response excitation, we believe that enough of the synchronous machines at any substation, to total at least 50% of the total synchronous machine kva. at said substation, should be so equipped with quick-response excitation. One of the characteristic features of the aforesaid quick-response excitation system, as set forth in said Evans et al. Patent No. 1,692,495, is that the slope of the exciter-voltage response, under any normal operating load condition immediately preceding a disturbance, shall be at least 200 volts per second, with a sufficiently high "ceiling" voltage, or maximum exciter voltage, to apply the necessary momentary maximum excitation to the synchronous machine in question.

To give a concrete illustration, the exciters which we utilize for exciting the respective 35,000-kw. generators 1 to 8 have a nominal voltage of 250 volts. The exciter voltage under normal operating load conditions is about 175 volts, and the ceiling voltage of the exciter is about 375 volts. The rate of response of the exciter voltage, or the slope of the voltage-time curve of the exciter when its voltage is being built up at the maximum rate from the normal 175-volt value, is about 375 volts per second.

In the foregoing description referring to the single-line wiring diagram of Fig. 1, it will be understood that the characteristic of a single-line wiring diagram is that all of the phases of a polyphase circuit shall be indicated by a single line in the diagram, thereby avoiding the complication of a separate line from each phase conductor. In the system shown in Fig. 1, we utilize 3-phase generators, 3-phase transformers or three single-phase transformers for each polyphase line, 3-phase circuit breakers or three single-phase circuit breakers for each polyphase line, and 3-phase transmission lines, buses and connections.

Our invention is particularly applicable to super-power polyphase transmission systems, such as the one shown in Fig. 1, which utilize synchronous machines and in which the reactance of the lines is so great that the stability problem is paramount in determining the power-carrying capacity of the system. Thus, in the particular system shown in Fig. 1, each of the water-wheel generators 1 to 8 has a transient reactance of 30% and a rated synchronous reactance of 80%. The transformers each have a 10% reactance. Each of the two 135-mile transmission lines 23a and 23b has a reactance of 50% on the basis of 280,000 kva., which means that the line reactance with both lines in service is 25%, the total load being 280,000 kva. The receiving network, including substation 4 and all points beyond it, is conveniently figured as consisting of a single translating device having a reactance producing an equivalent effect, which, in this instance, amounts to 28% reactance on the basis of 280,000 kva. The natural oscillating period of the system just described, or the time necessary for a complete cycle of the system-swing resulting from the application of an impulse of very brief duration, is of the order of about 0.7 second.

Before giving details of the operating-speeds, operating-methods and circuit-connections of our breakers, relays and other control and switching equipment, we shall refer to the curves shown in Figs. 2 and 3 which are explanatory of some of the characteristics of systems of the general type shown in Fig. 1.

Fig. 2 is a reproduction of a curve-diagram which was calculated, some years ago, in connection with another system which had a slightly different oscillation characteristic than the system shown in Fig. 1, but which was of the same general nature. The curves shown in Fig. 2 were prepared for the purpose of showing that the then-standard breaker speed of 0.8 second was preferable to a breaker speed of 0.5 second which was then being contemplated for obtaining what was then considered to be fast breaker operation on a 220-kv. line. These curves proved very clearly that the so-called fast breaker speed of 0.5 second would almost certainly cause the system to lost synchronism by the over-swing resulting from interruption of the fault and at a time slightly in excess of the first maximum swing of the phase-angle displacement of the rotors of the synchronous machines at the two ends of the line. In Fig. 2, the curve marked "switching" shows the variation in the angle between the rotors of the machines, as a result of the switching-out of one of the two parallel transmission lines, when there is no fault on the system. The other curves of this figure show the operation for a certain type of single-phase short circuit of from 0.5 second duration to 0.8 second duration, as indicated, counting the time from the instant of application of the short circuit.

Figure 3 shows the results of some calculations made upon a transmission system substantially as shown in Fig. 1, indicating the time available for circuit-breaker operation, in order to maintain synchronism, for different types of faults plotted against the load which this system was carrying immediately previous to the fault. The load is here indicated as percentages of the maximum load which the system could carry and still stand the switching operation when there is no fault on the system. This 100% may be as high as 95% of the steady-state power-limit of the line after the switching operation, that is, with one section of the line disconnected from service.

The types of short-circuits considered in Fig. 3 are somewhat different from those which were considered in connection with Fig. 2, in that the short-circuits of Fig. 3, were of such nature as to cause the initial variation in phase-angle between the rotors to be positive rather than negative as in Fig. 2. The curve marked "1 single-phase short" applies substantially either to a line-to-line fault or a line-to-ground fault, to which we have applied the designation "short" or "short-circuit", notwithstanding the fact that the expression "short-circuit" is sometimes reserved, by operating men, to designate line-to-line faults exclusively, as distinguishing from grounds.

We have not yet discussed ways and means of securing such operation of breakers and relays as will make possible the clearing of faults within the small number of cycles indicated in Fig. 3. We are merely indicating, in connection with Fig. 3, the transmission-line performance which may be expected if the faults of the different types indicated may be cleared within the number of cycles shown in Fig. 3.

It was our insistance upon this quick fault-clearing action, from the standpoint of transmission-line performance, that has resulted in the tearing away from old circuit-breaker and relay standards and the development of new equipment for operating in such short time that the phase-displacement or phase-swing of the internal voltages of the machines at the two ends of a line is checked before it has reached a point beyond which recovery would be impossible or jeopardized. In this respect, our present system does the same thing, with circuit-breakers and relays, that the quick-response excitation system has been doing, for several years past, with the exciters and regulators of the synchronous machines, namely checking the phase-swing of the system before it has reached a point beyond which stability is jeopardized; with the significant difference, however, that, whereas the quick-response excitation system would do well to handle most single-phase short-circuits, our quick breaker and relay systems will handle two simultaneous line-to-ground short-circuits, as indicated by the center curve in Fig. 3; and even dead three-phase short-circuits on one of the lines just outside of the bus, as indicated by the lower curve in Fig. 3. Experience has shown, furthermore, that a surprisingly large percentage of the disturbances actually encountered on the line affect two phases simultaneously or even all three phases simultaneously.

Reference to the central curve in Fig. 3 will show that when the time of clearing a double single-phase fault is longer than about 7 cycles, on a 60-cycle system such as that shown in Fig. 1, the amount of load which can be carried by the system, even though the fault is cleared within the first quarter-cycle of the system oscillation, is not very much affected by the rate of operation of the breaker, so that the speed of breaker-operation does not become significant, from a stability standpoint, until a speed approaching this critical time of operation is reached. If the fault is not cleared within the first quarter-cycle of the system oscillation, the system will almost invariably lose synchronism upon the occurrence of two simultaneous single-phase faults. 7 or 8 cycles is thus a critical time within which the relaying and circuit-breaker systems should operate, from a standpoint of system-performance, although substantial benefits may be obtained from making the fault-clearing means quick, even though the circuit-breaker operating-periods, are somewhat longer than the 7-cycle period just mentioned, e. g. 10 or 12 cycles or even 15 cycles. This should be distinguished from operating times of the order of 80 or 100 cycles, or more, in high-voltage circuit-breakers and relaying systems of the prior art.

An exemplary embodiment of relaying systems, control equipment and circuit-breakers for obtaining the operation just mentioned will now be described.

Fig. 4 shows, by way of giving a concrete example, a substantially complete relaying diagram of the apparatus which is used in connection with one section of the multiple-circuit lines at 23a at substation No. 2. The equipment of Fig. 4, which has been previously mentioned hereinabove, consists of the two buses 18' and 19', through which power is fed into the twin lines 23a and 23b through circuit-breakers 20, 21 and 22.

One of the important features of our quick-acting relay system is, that the circuit-breakers at both ends of a faulted line must be tripped "simultaneously", by which we mean substantially simultaneously, in contradistinction to "sequential" or "cascade" operation, in accordance with the practices of the prior art, wherein it was frequently necessary to first trip out the circuit-breaker nearest a fault before the relaying system at the other end of the line-section could distinguish between the sound lines and the faulty lines. It is also vitally essential that the relaying system should make a very positive selection between a faulty line-section and a sound line-section, so that only the breakers necessary to isolate the faulty section are opened.

In view of the fact that the number of generators connected to the line is usually proportional to the load which is being carried by the line at any time, there may be a wide discrepancy between the amount of short-circuit current which can be drawn from the line at different periods of its operation, so that the short-circuit current flowing into a fault at a remote point of a lightly loaded line may not be as great as the maximum load current carried by the line when all of the generators are in operation. Consequently, relaying systems responding solely to the line currents are ruled out, and it is necessary to utilize some sort of distance-responsive relay for responding instantly to the distance of the fault from the sub-station at which the relay is placed. The most practicable form of distance-responsive relay is an instantaneous impedance relay which responds to a predetermined line impedance or ratio of the voltage to the current of the line-section which is to be protected.

Impedance relays have been used, on single-phase lines, which have been distinguished by slow-acting time-delay relays in which the time delay was essential to the proper discriminatory action of the relay system as a whole, as set forth, for example, in Patents Nos. 1,292,584 and 1,292,585 granted January 28, 1919 to L. N. Crichton. These impedance relays have heretofore been associated with certain directional relays for responding to the direction of power-flow in an overloaded line, but these directional relays also, whenever used prior to our invention, have been slow-acting mechanisms, quite unsuited to the requisites of our present system.

As shown in Fig. 4, we provide, at each end of each line-section six instantaneous impedance relays $50^a$, $50^b$, $50^c$ and $50^A$, $50^B$, $50^C$, for responding, respectively, to line-to-line faults and single-phase grounds. Each of these impedance relays, for example, the impedance relay $50^a$, comprises a current-responsive relay-actuating coil 51 and two voltage-responsive relay-restraining coils 52 and 53, the latter being connected in series with a resistor 54 and a reactor 55, respectively, for the purpose of preventing chattering of the relay. Each of the impedance relays is provided with two pairs of contacts 56 and 57 for closing the circuits to a main tripping relay 58 and an auxiliary tripping relay 59, respectively.

Current for the current-responsive coils 51 of the impedance relays is derived from the respective phases of three current transformers 60 which are energized from the three phase-conductors of the transmission line 23a to be protected, the secondary windings of said current transformers being connected in star, with the neutral point grounded for the sake of simplifying the connections.

Voltage for the voltage-responsive coils 52 and 53 of the impedance relays is derived from a low-voltage potential-transformer 61 having grounded-neutral star-connected windings, the primary winding of said potential transformer being connected to an intermediate point of a string of small serially connected capacitors 62, which are connected across the transmission line 23a to be protected. These capacitors may conveniently take the form of special insulator-strings supporting the line 23a as it comes into the sub-station, said insulator-strings being composed of insulator-units having somewhat larger metallic surfaces than ordinary, in order to carry considerable capacity current which may be tapped off at a suitable low-voltage point to provide abundant energy for actuating all of the voltage-responsive coils 52 and 53 of the six impedance relays. This construction makes it possible to utilize a comparatively inexpensive low-voltage potential-transformer 61, instead of a very costly high-voltage transformer insulated for the line voltage of 220 kv.

The six impedance relays $50^a$, $50^b$, $50^c$, and $50^A$, $50^B$, $50^C$, are connected with their current and voltage coils in the corresponding delta-phases and star-phases, respectively, of the current transformers 60 and the potential transformers 61, as shown on the drawings.

It will be understood that each of the coils 51, 52 and 53 of each impedance relay is provided with its own armature, as shown.

The impedance relays are equipped to operate "instantaneously" that is, without any time-delay mechanism, being capable of closing within from ½ cycle to ¾ cycle, or within 1 cycle, from the instant that the relay setting is exceeded. In general, this instant happens within a period of something of the order of ¼ of a cycle after the occurrence of a fault.

In view of the fact that the impedance relays are so fast in their operation, it is necessary to provide against what are commonly known as asymmetrical faults, which are faults occurring at such points on the voltage wave that the first few half-cycles of the fault current are distorted by reason of an asymmetrical direct-current component having a very strong decrement. The result of this asymmetrical component would be to cause faulty operation of the quick-acting impedance relays, in view of the fact that such relays operate within the period when the asymmetrical component is very strong, sometimes making the first half-wave of current much larger than the actual alternating-current component, and sometimes making it much smaller.

To obviate this difficulty which is experienced when the time of operation of the impedance relay is speeded to within one cycle or less, we have provided so called "transient shunts" 64 which are shown at the bottom of Fig. 4. Each of these shunts consists of an impedance device comprising reactance and resistance in substantially the same proportions as the average expectable relative proportions of reactance and resistance in the respective transmission-line phase-conductors, during the fault conditions which are the most difficult from a relaying standpoint. These transient shunts 64 are connected in parallel across the current-responsive actuating coils 51 of the six impedance relays, said current-responsive coils 51 being disposed in circuits comprising serially connected resistors 65 which are sufficiently large to give each current-coil circuit a very short time-constant, so that the transient shunts 64 will behave in a manner very similar to the faulty lines and will absorb the transient asymmetrical component of the short-circuit current, so that the current-responsive coils 51 of the impedance relays will respond substantially exclusively to the real alternating-current component of the fault current. This is a departure from previous relaying practice which has been strongly against inserting any resistance in series with a relay coil which is connected across a current transformer.

When a fault occurs on one of the lines of a multiple-circuit transmission line, current flows into that fault, not only from the terminals of the faulty line, but also from the adjacent sound lines which thus feed power, sometimes, in a reversed direction into the terminal which is nearest the fault. If the fault is very close to this terminal, the reverse current flowing in the sound lines may, under some conditions, be substantially as large as the current flowing in the faulty conductor from the terminal towards the fault. At least, the reverse current-flow in the sound conductors, coupled with the low line voltage which results from the fault, will frequently be quite large enough to exceed the settings of the impedance relays associated with said sound conductors. It is necessary, therefore, to utilize some sort of reverse power-responsive mechanism to prevent faulty relay operation in the sound lines, and we have shown three such reverse-current relays 67, 68 and 69.

In its essentials, each of the reverse-current relays, such as the relay 67, comprises two current-coils 70, mounted on the two outer legs of an E-shaped core member 72, the central leg of which carries a polarizing coil 73, which is energized by means of a current of known direction and phase which does not change within the period of operation of the relay.

The polarizing current for the reverse-current relays, or directional relays, as they are sometimes called, may be supplied from any one of a number of convenient means; such as, a potential transformer energized from the line to be protected; or a small synchronous motor, or synchronous-synchronous motor-generator set, which is connected across a potential-transformer energized from the line, so as to be less affected by the severe decreases in the line voltage which sometimes occur at times of fault; or, where the relaying system is located in a generating station which includes a source of power for supplying energy to the lines, the polarizing current is sometimes obtained from the current flowing from the generators. As indicated in Fig. 4, the polarizing current is obtained from the potential transformers 61, through adjustable impedance devices 75, the voltage on the polarizing coils being upheld, in times of faults, by means of a small synchronous motor 76 shunted across the three phases thereof. It is to be understood, however, that the source of polarizing current indicated in our drawings is typical of any suitable source of current having a known direction and phase, without limiting our invention to any particular kind or source of such current.

Each of the reverse-current relays 67, 68 and 69 is provided with contacts for two separate circuits, and these contacts are connected in series with the two pairs of contacts 56 and 57 of the corresponding star-connected impedance relay 50$^A$, 50$^B$ or 50$^C$, the current-coils 70 of the respective reverse-current relays 67, 68 and 69 being connected in series with the corresponding current-coils 51 of the impedance relays 50^A, 50^B and 50^C, respectively.

It will be noted that the respective pairs of contacts 56 and 57 of the delta-connected impedance relay 50^a are connected in parallel with the respective pairs of contacts 56 and 57 of the star-connected impedance relay 50^A, and so on for the rest of the impedance relays, so that each of the polarized relays, as 67, will serve to prevent faulty operation of two of the six impedance relays.

The circuits including the contacts 56 are all connected in parallel between a battery 78, or other source of power, either direct-current or alternating, and the main quick-acting tripping relay 58, the contacts of which complete a circuit between a large high-voltage battery 79 and the tripping coils 80 and 81 of the circuit-breakers 20 and 21 which supply power to the end of the transmission line 23a at station No. 2. The circuits including the other contacts 57 of the impedance relays are also connected in parallel between the battery 78 and the auxiliary tripping relay 59, the contacts of which are connected in parallel with the contacts of the main tripping relay 58.

The polarized relays 67, 68 and 69 must be capable of moving very fast, so that, if power is flowing in the two parallel lines 23a and 23b away from station No. 2, immediately preceding a fault on one of the lines, so that the contacts of the directional relays 67, 68 and 69 are closed, and if a fault then occurs on either of the lines 23a and 23b close to station No. 2, the directional relays 67, 68 and/or 69 associated with the other line will open substantially as fast as, or preferably faster than, the impedance relays, so as to prevent faulty tripping-operation by reason of the closure of any of the impedance relays as a result of the heavy reverse currents flowing from the sound line into the faulty one through the sub-station connections.

It will be clear, from the foregoing, that both the impedance relays and the reverse-current relays are very quick in their action, having no dash-pots or other time-delay apparatus connected thereto. When making these relays so fast in their operation, care must be exercised that they do not vibrate with the pulsations of power therein. This difficulty is remedied, in the case of the impedance relays shown on the drawings, by splitting the voltage-coils into two circuits including resistance 54 and reactance 55, respectively, so as to decrease the severity of the torque-pulsations and to increase their frequency.

In connection with the reverse-current relays, we have found it sufficient merely to provide a source of polarizing current which is very accurately in phase with the current flowing in the line-current-responsive coils 70. To this end, we may provide means associated with the coils 70 and 73 of the directional relays, in order to bring their currents into exact phase coincidence when the normal power-transmitting current is flowing away from the sub-station. As shown on the drawings, a phase-modifying means 75 is connected in series with the polarizing coils 73 of the three directional relays 67, 68 and 69, said phase-modifying means being shown as a variable-impedance device consisting of reactances and resistances which may conveniently be varied inversely so as to make slight adjustments in the phase of the current in the polarizing coils 73, without materially changing the magnitude of the current, although small changes of magnitude would be of no importance.

It will be understood that the relaying apparatus thus far described is provided at each end of each line-section, and that the circuits and apparatus shown in Fig. 4 are limited to one end of one line-section only, merely to avoid unnecessary confusion in reading the drawings.

The actuating coil of the auxiliary tripping relay 59 is permanently connected in parallel to the corresponding auxiliary tripping coil (not shown) at the other end of the line-section, so that whenever the relaying apparatus at one end of the line-section operates to trip its circuit-breaker means, such as the circuit breakers 20 and 21 at station No. 2, it will also, by means of the auxiliary tripping relays 59, trip the corresponding circuit-breaker means provided for clearing the other end of the faulty line-section.

Any suitable means may be provided for securing the operative connection between the actuating coils of the two auxiliary tripping relays 59 at the two ends of a line-section. Merely by way of illustration of such means generically, we have shown, in Fig. 4, a pilot wire 85 which may consist of two well insulated wires twisted together, and preferably located on a highway paralleling the right-of-way for the high-voltage transmission lines 23a and 23b in order to avoid extremely high induced voltages which would necessitate an uneconomical amount of insulation in the pilot wires, and also in order to facilitate maintenance.

We are by no means limited to a pilot wire, however, and this is indicated as generic of any means for effecting the simultaneous actuation of both of the auxiliary tripping relays at the two ends of the faulty line-section. This generic class of connecting means includes a carrier-current connection, high-frequency currents or impulses, or alternating-current pilot-wire systems with suitable repeaters so that the pilot wire may be located even along the right-of-way of the transmission line.

We have shown a main tripping relay 58 and an auxiliary tripping relay 59, the latter being connected to the pilot wire or equivalent paralleling means, in order to provide an additional safeguard in case the pilot wires should become crossed, so that the main tripping coil 58 will always be free, regardless of any trouble on the pilot wire or equivalent connection between the two ends of the line-section.

With a relaying system as above described, in conjunction with circuit-breakers operating at a sufficiently high speed, such as within less than 6 to 8 cycles on a 60-cycle system, or even with breakers operating as slow as 1/5 of a second, we are able to make vast improvements in the system-stability, approaching a power-limit determined by the carrying capacity of the system with the defective line cut out from an initial state of all lines in service, that is, we are able to approach the limit imposed by the switching operation, as we decrease the total time for breaker-operation down to 6, 4 and 2 cycles. This limit, of course, is considerably less than the carrying capacity of the system with all lines in service, because the loss of the line in trouble reduces the capacity after the fault.

To largely remove the difficulty imposed by the limited power-transmitting capacity with one line-section tripped out, we provide a high-speed reclosing circuit-breaker system in connection with the high-speed fault-clearing system, preferably, although not necessarily, in conjunction with some form of fault-detecting apparatus to insure that the fault is cleared before reconnecting the circuit-breakers even once. Thus, if a lightning discharge causes a transmission line to flash over, power current will follow the flash-over and will persist until voltage is removed from the line. Once the power supply is removed from both ends of the line, the latter is immediately in condition for further service. Therefore, if the line is reconnected at sufficient high speed, it will be made available for service in such short time that its loss has scarcely been felt by the system.

Such reconnecting operation contemplates a complete cycle of opening and closing the breakers in a time-interval of 0.25 second. Thus, the integrated effect of dropping the useful load-carrying capacity of the faulty line section for an exceeding short period of time is insufficient to produce any very pronounced system effects, and the useful power-carrying capacity, of a system in which the transmission lines have two or more circuits in parallel, approaches the carrying capacity of the system with all lines in service rather than the carrying capacity of a system having all lines but one in service. This is a very considerable difference when there are only two lines in parallel, and it is an infinite difference when there is only one transmission line.

As shown in Fig. 4, the reclosing relaying system comprises a reclosing relay 87, which is energized from a battery 88 whenever the circuit-breakers 20 and 21 are both open, or nearly fully opened, by means of back-contacts 88a and 88b on the circuit-breakers, so as to connect a normally disconnected 500-cycle generator 89 across the faulty transmission line 23a to furnish a voltage for fault-measuring purposes, the connection being conveniently made by means of taps on a capacitance device 90, similar to the capacitance device 62 which has already been described in connection with the potential transformer 61.

The leads of the 500-cycle generator 89 include a star-connected bank of current-transformers 91 which are connected with three star-connected under-current relays $91^A$, $91^B$ and $91^C$ having serially connected contacts which remain closed except when the current reaches such a high value as to indicate the presence of a short-circuit on the line. These contacts complete a circuit including a battery 92 and an auxiliary contact 93 on the reclosing relay 87, said auxiliary contact 93 being closed last of all to energize a circuit-breaker-actuating relay 94, causing it to close its contacts 95 which are connected between the previously mentioned circuit-breaker-actuating battery 79 and the closing coils 96 and 97 of the two circuit-breakers 21 and 20, respectively, which are associated with the end of the transmission line 23a at station No. 2. At the same time that the circuit-breaker-actuating relay 94 closes, it interrupts the circuits leading to the 500-cycle generator 89 by means of auxiliary contacts 99 on the circuit-breaker-actuating relay 94.

The circuit-breaker-actuating relay 94 may have its actuating coil permanently connected in parallel to the actuating coil of the corresponding relay at the other end of the line-section, by means of a second pilot wire 100, or other equivalent means, so that the circuit-breaker means at both ends of the faulty section are reclosed simultaneously. It will be apparent that when the second pilot wire 100 is utilized, as shown, it is not necessary to duplicate the reclosing mechanism at the other end of the line, except for a simple circuit-breaker-actuating relay similar to relay 94, but omitting the auxiliary contacts 99.

The reclosing relay system comes into operation at about the instant when the two ends of a faulty line-section, as 23a, are disconnected from the transmission system by means of the circuit-breaker means at its respective ends. This operation is secured by the reclosing relay 87, which completes its closing movement at about, or immediately after, the instant just indicated. Then, if the fault on the line-section has been automatically cleared by the interruption of the power voltage, the under-load current relays 91^A, 91^B and 91^C remain closed, and the auxiliary contact 93 on the reclosing relay 87 serves to energize the circuit-breaker-actuating reclosing relays 94 at both ends of the line, thereby reconnecting the faulted line into service before the two ends of the line have had time to swing far enough apart to jeopardize synchronism.

In view of the fact that the 500-cycle generator impresses a known fault-measuring voltage on the faulted line, the line-impedance ratio of voltage to current is effectually measured by the current-responsive relays 91^A, 91^B and 91^C.

As a consequence of the re-closing operation just described, we are enabled to prevent loss of synchronism at many times when the transmitted load is so great, and the fault so severe, that loss of synchronism would have resulted if the faulted line had not been reconnected so promptly into service. It is to be noted that our high-speed reclosing system distinguishes from reclosing breaker systems of the prior art in preventing any interruption of service, rather than restoring an interrupted service as in the past.

As previously intimated, our invention has involved the development of high-voltage, high-capacity circuit-breakers of the unprecedentedly high speeds of operation, as well as a new type of high-speed relay system, and a new plan of transmission-line operation whereby an enormously larger load can be carried than ever before on any given system, with far less operating trouble from circuit-interruptions. And, as is so often the case, with new inventions, this enforced development of a high-speed breaker, for example, has proven to be not an unmitigated evil from the standpoint of the circuit-breaker design engineer, because it has been found that the new circuit-breaker is so much more effective, as a switching device, and the old style prevalent prior to our invention, that its manufacturing cost plus the cost of maintaining it in operation may be somewhere around the same overall cost as the old ones. The new high-speed circuit-breaker, which operates within 1/5 second, 10 cycles, 8 cycles, 6 cycles, or even less, is a more effective switching device, because less copper is volatilized and less oil burned up, both resulting in a saving in maintenance, and both resulting from the enormous reduction in the time of duration of the arcing.

The high-speed circuit-breaker action has three functions, outside of the high-speed relaying equipment which has already been described; namely, (1) a high-speed tripping action , (2) a high-speed acceleration of the moving parts, and (3) a high-speed arc-quenching means.

The high-speed tripping action may be obtained either by the use of a direct-current source of tripping energy, such as the battery 79 of Fig. 4, having a sufficiently high voltage to send an extremely powerful current through the tripping coils 80 and 81 of the circuit-breaker, said current being so high that the trip-coils would quickly burn out if they were not instantly opened, as by means of auxiliary contacts 101, as shown, by way of illustration, in connection with the breaker 21. Other means for obtaining a high-speed tripping action are set forth in Patent No. 1,531,596, granted March 31, 1925, to A. W. Copley, and assigned to the Westinghouse Electric & Manufacturing Company.

The high-speed mechanical acceleration of the moving parts of the circuit-breaker is obtained by the use of special materials permitting a reduction in the mass of the movable parts, and by the use of heavy accelerating springs for forcing these light movable parts quickly to open position. It is frequently necessary to absorb the stored energy of the moving parts, at the close of the movement, by oil dashpots, air dashpots, springs or other shock-absorbing devices. The greatest degree of high-speed movement of contact-parts is obtained when the contacts are trip-free within the pole units of the breaker, by which it is meant that the tripping mechanism within the circuit-breaker unit is tripped free of the reclosing mechanism, so that nothing has to be moved at high speed except the moving contact and its actuating rod, as set forth in an application by J. B. MacNeill, et. al., Serial No. 23,401, filed April 15, 1925. In this case, the follow-up action of the remote-control and operating mechanism takes place after the high-speed action has ceased, as will be clearer from the description of the specific circuit breaker construction of Fig. 11 hereinafter.

High-speed arc quenching in the circuit-breaker may be obtained, as subsequently described in detail, by providing an arc-restraining channel or slot, for restricting the arc which is composed altogether of ions and electrons and hence is very mobile and elusive in its ability to dodge around obstructions. Said arc is surrounded by an envelope of oil vapor which effectually isolates it from contact with fresh oil. However, if liquid oil is entrapped in pockets or interstices in the side walls of the arc-restraining channel or slot, and if magnetic means are provided, to which the arc-stream readily responds, causing the arc-stream to be forced along this slot so as to volatilize fresh oil as it moves along, thereby injecting un-ionized gaseous particles into the arc-stream, the arc can be very quickly extinguished, as set forth in an application by B. P. Baker and E. E. Kees, Serial No. 413,012, filed Dec. 10, 1929.

A further expedient for obtaining a high interrupting speed consists in the use of multiple breaks, that is, 6, 8, 10 or 12 breaks, or arcs in series, per pole, so that, with a given speed of moving parts, arc-length is introduced faster than in a conventional two-break circuit-breaker. Each break or arcing point may be equipped, of course, with the efficient arc-rupturing means referred to above.

In addition, electrostatic shields or other means may be provided for improving the voltage distribution in each of the arc paths at the moment of current-zero at which the arcs are to be interrupted, thereby reducing the chance of arc re-ignition at said current-zero, and thus reducing the time of duration of the arc.

When a multiple-break construction is utilized, it is also desirable, as a constituent part thereof, to provide means for controlling the division of the voltage across the several serially connected breaks or arcs.

In general, it may not be necessary or desirable to utilize all of the above-mentioned means for securing quick circuit-breaker action, but it will be desirable to utilize at least two of the following four means in combination, for securing a high rate of operation, to wit: (1) means for causing the movable circuit-breaker contacts to be trip-free within the pole units of the breaker; (2) means for retaining oil in the vicinity of the arc path or paths and means for moving the arc or arcs through, or into close proximity to, the retained oil; (3) a multiple-break construction having at least four serially connected breaks per pole; and (4) electrostatic shields or equivalent means for improving the voltage distribution in the arc path or paths at the moment of current-zero at which the arc or arcs is or are to be interrupted.

An exemplary circuit-breaker structure is shown in Figures 5 to 8 which illustrate one of the pole-units of one of the high-voltage reclosing circuit-breakers of the system shown in Fig. 4. As shown in Figures 5 and 6, each pole-unit of the circuit-breakers comprises a metallic tank 103 filled with oil 104 and having two terminal bushings 105 and 106 of the condenser type, leading down to two stationary contact members 107 and 108, which are spanned by a movable contact-member 109 supported and operated by a centrally disposed lift-rod 110 of wood micarta.

A special arc-quenching means is disposed for each of the ends of the movable contact-member 109, said arc-quenching means consisting of a bundle of slotted plates 112 of insulating material, interspersed with magnetizable plates 113 having somewhat wider slots 114 which are lined with insulating material 115 in order to completely protect the magnetizable material from the arc. The general construction of the stack of slotted plates will be understood from Fig. 10, which differs from Fig. 5 in showing six of such stacks of slotted plates instead of two. It will be understood that each stack of slotted insulating plates is stationarily mounted adjacent to one of the stationary contact members 107 and 108. The function of the slot in the stack of plate members 112 is to restrict the arc laterally, while the distorted magnetic field produced by the U-shaped magnetizable members 113 serves to cause the arc to move along the slot, thereby bringing it sufficiently close to fresh side-walls of the slot to vaporize the cold liquid oil which is entrapped in the interstices of the insulating material of said side-walls, thereby injecting fresh supplies of un-ionized oil vapors into the arc stream as it moves along, thus quickly quenching the arc, as set forth in the hereinabove-mentioned application of Baker and Kees.

The distribution of the voltage across each break, upon the extinction of the arc, is controlled by means of electrostatic shields in the shape of dish-shaped members 116 and 117 of conducting material, which serve to impede the re-ignition of the arc by preventing the occurrence of excessive potential-gradients at the terminals of the gap-space previously occupied by the arc.

The circuit-breaker shown in Figures 5 and 6 is operated by a toggle mechanism 120 mounted on the top of the tank 103 and connected to the lift-rod 110. This mechanism is connected, by means of lateral and vertical operating rods 121 and 122, respectively, to a solenoid mechanism 123, which is disposed alongside of the tank, said solenoid mechanism including the trip coil 80 and the closing coil 97, for example. As shown in Fig. 7, a strong tension spring 124, which we call the accelerating spring, is mounted on one end of a lever 125 of the solenoid mechanism, the operating end of said lever being connected to the bottom of the vertical operating rod 122, so as to push up on said rod and hence, through the connecting mechanism shown in Fig. 7, to push down on the lift-rod 110 which is disposed inside of the tank for supporting the movable contact-member 109.

The armature of the closing coil 97 is pivotally connected to an intermediate point 126 of a main lever 127, as shown in Figures 7 and 8. The right-hand terminal of the main lever 127 is broken off in Fig. 7, to show other parts to be subsequently described, but, as shown in Fig. 8, this end of the main lever 127 is pivoted at a stationary point 128, which is disposed somewhat above the trip coil 80. The other end of the main lever 127 is held against upward movement by means of a holding latch 129 which is in operative engagement with the lever when the circuit breaker is locked in its closed position. The main lever 127 is strongly biased toward an elevated position by means of two horizontally disposed retrieving springs 130 which are connected to depending side arms 131 carried by the lever at its pivotal point 128, for a purpose which will be subsequently described.

Connection is made, between the main lever 127 of the closing mechanism and the lever 125 which is connected to the bottom of the operating rod 122, by means of a trip-free lever 133 which is pivoted to the main lever 127 at the point 126 where the armature of the closing coil 97 is connected thereto. The right-hand end of the trip-free lever 133 is normally held against upward movement by means of a trip latch 134, which engages the same when the circuit-breaker is latched in its fully closed position, and which is disengaged therefrom when the armature of the tripping coil 80 moves upwardly in response to the energization of said coil. The point of latching the right-hand end of the trip-free lever 133 is coincident with the stationary pivotal axis 128 of the right-hand end of the main lever 127. The left-hand end of the trip-free lever 133 curves upwardly, as shown at 135 in Fig. 7, so as to overhang the point of connection, 136, with the lever 125, to which the trip-free lever-end 135 is connected by means of a short-toggle link 137, as shown in Fig. 7. The connection point, 136, of the lever 125 tends to move upwardly, under the influence of the strong accelerating spring 124, thereby tending to move the upwardly-curved left-hand end 135 of the trip-free lever 133 over to the left, which movement is prevented by the trip latch 134, which restrains the right-hand end of the trip-free lever, and by the holding latch 129 which prevents the pivotal point 126 of the trip-free lever from moving.

The operation of the trip-free solenoid mechanism 123 of the circuit-breaker is as follows. When the circuit-breaker is latched in its fully closed position, as shown in Fig. 7, if the trip coil 80 is energized, its armature will be forced upwardly, disengaging the trip latch 134 from the right-hand end of the trip-free lever 133, permitting said end to swing upwardly a short distance, above its pivotal point 126, until the toggle-link 137 straightens out and swings upwardly relative to the upturned left-hand end 135 of the trip-free lever 133. This movement of the trip-free lever 133 causes its left-hand end 135 to knock against the holding latch 129 which restrains the left-hand end of the main lever 127. In the meantime, the opening movement of the circuit breaker has been started by the powerful accelerating spring 124 acting on the lever 125, which is free to swing as soon as the trip-free latch 134 is disengaged by the initial action of the trip coil 80. The circuit breaker thereafter continues to open independently of the operation of the main lever 127 of the closing-coil mechanism.

As soon, however, as the holding latch 129 of the closing-coil mechanism is disengaged, as above described, the retrieving springs 130 of the main lever 127 cause the latter to swing upwardly about its pivoted right-hand end, thus following up the movement of the lever 125 which carries the accelerating spring 124.

When the main lever 127 catches up to the opening mechanism, the right-hand end of the trip-free lever 133 is forced down into engagement with its latch 134, so that the parts are in condition for reclosing. Thus, when the closing coil 97 is energized, its armature is drawn downwardly, thereby depressing the common pivot point 126 of the main lever 127 and of the trip-free lever 133. When the circuit-breaker is fully closed, the left-hand end of the main lever 127 is latched by the holding latch 129. If, however, the fault is not cleared from the line, the trip coil 80 will become energized as soon as the contact blades of the circuit breaker come together, which is before the circuit breaker is fully closed, and hence, the tripping latch 134 will be instantly disengaged from the trip-free lever, thereby permitting the free movement of the toggle-link 137, as above described, permitting the lever 125 of the accelerating spring 124 to swing to its position corresponding to fully opened circuit-breaker contacts, thus pushing the operating rod 122 upwardly independently of the downward movement of the pivotal point 126 of the armature of the closing coil 97.

A modified construction of an extremely high-speed circuit-breaker pole-unit is shown in Figures 9 to 12. In this modification, instead of having a single pair of breaks, as in Fig. 5, we have three pairs of breaks, making six breaks in all. Each pair of breaks has its own pair of stationary contact members 140 and 141, as shown in Fig. 9, and its own movable contact member 142 of thin knife-blade sheet-copper.

The three movable contact elements 142 of the three pairs of breaks, as shown in Fig. 11, are mounted on a single suitably insulated moving cross-contact bar 143, the ends of said cross-contact bar being carried by two vertical suspension rods 144 and 145, the top ends of which are suspended from an insulating cross beam 146 which is connected to the bottom of a lift rod 147 which is pressed downwardly by a doubly acting 7000-pound compression spring 148. The suspension rods 144 and 145 may also be surrounded with auxiliary accelerating springs 149, which may be housed in insulating tubes 150. The springs 148 and 149 serve to force the moving parts downwardly when the circuit-breaker is tripped, and they also serve to exert a tension action, at the extreme downward movement of the parts, in order to take up the kinetic energy thereof.

Two terminal members 151 and 152 are provided. Each terminal member, such as the member 152 in Fig. 11, is provided with an insulating stationary support or cross beam 154 for supporting the three stationary contact members, as 141, on one side of the breaker.

The electrical connections between the three pairs of breaks which are provided by the three movable contact blades 142 are best shown diagrammatically in Fig. 10. From the terminal member 152, a connection 156 leads to the extreme left-hand stationary contact member 141. From the terminal member 151, a similar connection leads to the right-hand stationary contact member 140 on the other side of the breaker. Between these points, the six breaks are electrically connected in series, the connections being completed by two intermediate connections 158, one of which is shown in Fig. 11.

The three pairs of breaks may be segregated by means of insulating barriers 160 and 161, as shown in Fig. 11.

As shown in Fig. 9, each of the breaks is provided with a stack of slotted plates as heretofore described, and in addition, each stack of slotted plates is provided with conducting top and bottom plates 162 and 163, the bottom plate having a lip 164 which bears against the movable contact member 142, so as to break contact therewith only when the movable part nears its extreme lower position. The top and bottom conducting plates 162 and 163 of the slotted stack are connected by means of a resistor 166, intermediate points of which are connected to the several magnetizable plates 167, as shown in Fig. 9.

The resistors 166 are thus connected in parallel with the respective arcs which are drawn at the six serially-connected breaks of the circuit breaker. As soon as the arcs are interrupted, the voltage across each resistor 166 jumps from the voltage of the arc to one-sixth of the line voltage. The resistors 166 are of such magnitude as to carry a leakage current which is large in comparison to the capacity current which flows between the grounded portions of the tank and the metallic plates of the slotted stacks and the moving contacts, at the oscillatory frequency of the circuit. Thus, the distribution of the voltages across the arc-spaces between the terminals of each of the six gaps, as well as the division of the total voltage between the six serially-connected gaps, is controlled by the leakage-current effect of the resistors, rather than by the capacitor effects of the various parts. We are not limited to any particular value of leakage current. It may be something of the order of one-tenth of an ampere or less.

According to the modification shown in Figures 9 to 12, the magnetizable plates 167 of the slotted stack thus constitute electrostatic shields for controlling the distribution of the voltage across the arc space after the termination of the arc, such control being effected either by properly predetermining the capacitor effects of the several plates 167 or by connecting them to intermediate taps of the shunting resistor 166, or, by both methods, as shown in Fig. 9, wherein it is seen that the centrally-disposed magnetizable plate 167 is smaller than the others, thus having a smaller electrostatic effect than the others.

By reason of the construction shown in Fig. 9, the shunting resistors 166 serve effectually to control the division of the voltages across the several serially-connected gaps. The final downward movement of the thin knife-blade contact members 142 serves to break contact with the conducting lips 164 of the shunting resistors 166, thereby interrupting the current carried thereby after it has performed its function of controlling the distibution of the voltages across the several arc spaces after the interruption of the arcs.

In the form of construction shown in Figures 9 to 12, the circuit-breaker pole-unit is trip-free inside of the pole-unit, as distinguished from being trip-free at the closing-coil mechanism. The trip coil 80 is disposed in a housing in the head of the circuit-breaker tank, and by the upward pulling movement of its armature, disengages a pilot-latch 170 which, in turn, frees a trip latch 171, which thus disengages a corner 172 of a triangular trip-free lever 173. One apex of the triangular trip-free lever 173 is connected to the top of the lift-rod 147 by means of a link-connection 174. The remaining corner 175 of the triangular trip-free lever 173 is pivoted to one corner of a second triangular lever 176 which is permanently pivoted at a point which is in alignment with the point 172 which is engaged by the tripping latch 171. The third apex of the second triangular lever 176 is connected to a toggle-link 178 which engages one end of a lever 179 of the reclosing mechanism, the other end of the reclosing lever 179 being normally forced upwardly by means of a link 180 which connects to a solenoid lever 181, which is pressed upwardly by means of a compression spring 182.

In operation, the strong downward pull of the accelerating spring 148 on the lift-rod 147 of the circuit breaker causes the triangular trip-free lever 173 to tend very strongly to swing downwardly about its latched apex 172 as a pivot, thus exerting such a strong compressional thrust on the toggle-lever 178 that the upward bias of the compression spring 180 of the reclosing mechanism is unable to break the toggle connection between the toggle-link 178 and the lever 179.

As shown more clearly in Fig. 12, as soon as the trip coil 80 is energized, it releases the tripping latch 171, which permits the trip-free lever 173 to freely swing about its point 175 where it is connected with the second triangular lever 176. The trip-free lever then assumes the position shown by the dotted lines 173a in Fig. 12, which corresponds to the extreme downward limit of the movable parts of the circuit breaker. There is a certain rebound, however, to the movable parts of the circuit breaker, which causes the top of the link 174 to move from the position indicated at 184 in Fig. 12 to the position indicated at 185 in the same figure. Meanwhile, however, as seen from Fig. 11, the compressing force exerted by the accelerating spring 148 upon the toggle lever 178 has been relieved, so that the compression spring 182 of the reclosing mechanism is able to break the toggle joint between the lever 179 and the link 178, thereby pulling the link 178 over to the left, causing the bottom apex of the second triangular lever 176 to swing through an arc, as indicated at 186 in Fig. 12. This swinging movement of the second triangular lever 176 moves the pivotal point 175 of the trip-free lever 173 to the position 175b in Fig. 12, causing the trip-free lever 173 to assume its final re-set position, as indicated by dot-and-dash lines 173b in Fig. 12. As will be clear from Fig. 12, this final movement of the trip-free lever 173 brings its apex 172 back into its original spacial position where it again becomes interlocked with the tripping latch 171.

The parts are now in condition for reclosing, which is effected by means of the closing coil 97 drawing its armature 188 downwardly and thus, by its pivotal connection 189 with the reclosing lever 181, drawing down the reclosing mechanism against the force of the compression spring 182, and restoring the parts to the fully closed position shown in Fig. 11.

In case, however, the fault has not been cleared from the line, the trip coil 80 will become energized, as in the first-described circuit-breaker, before the circuit-breaker parts are fully closed, thereby disengaging the reclosing mechanism and permitting the parts instantly to open under the force of their accelerating springs 148 and 149.

It will be noted that the foregoing discussion of our invention for obtaining improved transmission-line operation, with less possible interference with adjacent communication circuits, by means of quick-acting breakers and relays has had reference specifically to high-voltage switching, by means of high-voltage circuit-breakers, rather than low-voltage switching on the low-voltage sides of the step-up transformers, because of the very limited flexibility of low-voltage switching, rendering it seldom applicable to multiple-circuit transmission lines of the type to which our invention mainly applies. It will be understood, however, that our invention, in all of its aspects, is not altogether limited to high-voltage switching.

It will be further noted that we have shown and illustrated an impedance relay which measures the distance of a fault from the relaying point by responding to a critical value of the impedance of the line, so that, if the line-impedance falls below this critical predetermined value, the relay will operate. By using the term "impedance", we mean to include any significant component of the impedance, such as the line-reactance, if it is desired to have the distance-responsive relays respond to only the reactive components. When means are utilized, such as our pilot wire 85, for securing simultaneous operation of the breakers at both ends of a faulty line-section, whenever the fault-responsive relaying equipment is actuated at either end of the line, it will not be necessary to very accurately estimate the distance of the fault from the relaying point, because the relays at each end of a line-section need take care of only those faults which occur between said end and the half-way point of the line-section. Thus, when either relaying equipment operates, at either end of the line-section, it will simultaneously trip the breakers at both ends. This is of very considerable advantage in the relaying mechanism and, in general, it will render unnecessary such refinements as making the distance-measuring means responsive to the line-reactance exclusively.

Our quick-acting breaker and relay system has been approached, but not quite attained, in various suggestions appearing heretofore, as in:

(1) Discussions by C. Le G. Fortescue and S. B. Griscom, presented orally on February 9, 1925, and published in A. I. E. E. Journal, July, 1925, pages 768 and 771, pointing out the advantage of a quick-acting breaker and the possibility of developing the same, as a means for improving the stability of transmission lines;

(2) An A. I. E. E. paper presented by C. Le G. Fortescue in September, 1925, on Transmission stability, analyzing transmission oscillations with respect to the duration of faults, and pointing out the necessity for developing a high-speed breaker for increasing the stability of transmission systems;

(3) An A. I. E. E. paper presented by R. D. Evans and C. F. Wagner in February, 1926, on Transmission stability, presenting a theoretical explanation and mathematical analysis of faults, and pointing out the advantages which would result from the use of much faster circuit-breakers than were then available;

(4) Discussion by C. Le G. Fortescue, presented orally on February 8, 1926, and published in A. I. E. E. Journal, September, 1926, page 880, again pointing out the need for quickly operating circuit breakers; and (5) An A. I. E. E. paper presented by C. F. Wagner and R. D. Evans in September, 1927, on Static stability limits, etc., containing an explanation of transmission-line calculations and having an Appendix III deriving the acceleration formula for a synchronous machine during a fault on a transmission line.

Certain results of tests made on an "artificial" line under our general direction, or assistance in planning, have also been published in an article by J. H. Ashbaugh and H. C. Nycum in The Electric Journal, October, 1928, pages 504–509.

It will be noted that none of the published literature just mentioned discloses the entire combination, with all the necessary parts and time-limits of the several parts, necessary to the operation of a successful quick-acting breaker-and-relay system for coming into operation in such short time that the phase-swings at the two ends of a faulty line shall not be so violent that stability is lost when a polyphase fault occurs, or even when a double single-phase fault occurs.

Some of the limits of the operating periods of the several parts of our system have been indicated hereinabove, particularly in connection with a preferred form of embodiment in an exemplary transmission system which has been illustrated. A few further limits may also be indicated.

In general, it is not desirable to make the arc-interrupting action of the circuit-breaker so intense that the arc is interrupted in less than one cycle, or sooner than the second current-zero, because if quicker action is attempted, the arc is sometimes likely to be interrupted at a point other than current-zero, with the consequence that a very severe voltage-surge is imposed on the line. In speaking of the speeds of circuit-breaker operation, we refer to the speed of the breaker at its rated current-rupturing capacity, and not its speed at certain smaller values of current which may involve a somewhat longer time of arcing than when the larger currents are being interrupted.

A practical limit of operation is obtained from Fig. 3, by noting that the period within which the fault is to be cleared shall be so short that the relative phase-positions of the ends of the faulty section shall not change to the point where stability would be jeopardized, if a double single-phase short-circuit should occur when the line is carrying 40%, or less of its switchable load, or if a three-phase fault occurs when the line is carrying, say 30% of its switchable load, by switchable load meaning the maximum load which the line can carry and still withstand the switching operation of tripping out one of the three-phase parallel circuits or line-sections, without loss of synchronism.

Considered from the standpoint of the electro-mechanical oscillation of the transmission system as a whole, the maximum period available for the operation of circuit-breakers and relays in accordance with our invention may be put at less than one-quarter of the complete natural period of the free electro-mechanical oscillation of the system, by which is meant the oscillation which results from the application of an impulse of very brief duration.

In any practical system utilizing our invention, the circuit-breakers must be trip-free, either by the disconnection of the moving contacts from the remote-control parts of the breaker within the pole-unit itself, as set forth in the above-mentioned MacNeil-Aalborg case and as shown in Figs. 9 to 12 of our drawings, or by being trip-free at the solenoid, that is, by having arrangements such that the breaker cannot be held closed against a short-circuit by an operator continuing to excite the closing coil from the switchboard because the tripping relays 58, 59 and trip coil 80 or 81 will disengage the breaker parts from the closing solenoid 97 or 96 as soon as the short-circuit current starts to flow, as is the case with the breaker shown in Figs. 5 to 8 of our drawings. Breakers which are not trip-free, that is, which are susceptible of being closed in on a fault, and held in, even momentarily, by the manipulation of the operator, or which take time to latch in before tripping can be started, are quite out of the question in our quick-breaker transmission system, because the substantial advantages of quick-breaker protection would thereby be forfeited, and synchronous operation of both ends of the transmission system would no longer be safeguarded.

We claim as our invention:

1. As a means for increasing the stability, the continuity of service and/or the power limits of an electrical system comprising synchronous machines connected through step-up transformers and multi-circuit polyphase transmission lines of such reactance that the power-carrying capacity, with stability, is limited by reactance in the system, the combination, with said system, of sectionalizing means comprising a quick-acting, trip-free circuit-breaker means at each end of each section, means for interconnecting the parallel multi-circuit lines at one or more points, and quick-acting means for selectively opening the two circuit-breaker means at the two ends of a faulty section in the event of a fault in one section, characterized by the fact that both of said circuit-breaker means on the faulty section have arc-suppressing means operative to cause the circuit breaker to open the circuit of the faulty line within not more than approximately one-fifth of a second after the occurrence of a serious fault requiring to be cleared.

2. As a means for increasing the stability, the continuity of service, and/or the power limits of an electrical system comprising synchronous machines connected through step-up transformers and multi-circuit polyphase transmission lines of such reactance that the power-carrying capacity, with stability, is limited by reactance in the system, the combination, with said system, of sectionalizing means comprising a quick-acting, trip-free circuit-breaker means at each end of each section, means for interconnecting the parallel multi-circuit lines at one or more points, and quick-acting means for selectively opening the two circuit-breaker means at the two ends of a faulty section in the event of a fault in one section, characterized by the fact that both of said circuit-breaker means on the faulty section have arc-suppressing means operative to cause the circuit breaker to open the circuit of the faulty line within from 1 cycle to one-sixth of a second after the occurrence of a serious fault requiring to be cleared.

3. As a means for increasing the stability, the continuity of service and/or the power limits of an electrical system comprising synchronous machines connected through step-up transformers and multi-circuit polyphase transmission lines of such reactance that the power-carrying capacity, with stability, is limited by reactance in the system, the combination, with said system, of sectionalizing means comprising a quick-acting, trip-free circuit-breaker means at each end of each section, means for interconnecting the parallel multi-circuit lines at one or more points, and quick-acting means for selectively opening the two circuit-breaker means at the two ends of a faulty section in the event of a fault in one section, characterized by the fact that both of said circuit-breaker means on the faulty section have arc-suppressing means operative to cause the circuit breaker to open the circuit of the faulty line within not more than approximately 8 cycles after the occurrence of a serious fault requiring to be cleared.

4. As a means for increasing the stability, the continuity of service and/or the power limits of an electrical system comprising synchronous machines connected through step-up transformers and multi-circuit polyphase transmission lines of such reactance that the power-carrying capacity, with stability, is limited by reactance in the system, the combination, with said system, of sectionalizing means comprising a quick-acting trip-free circuit-breaker means at each end of each section, means for interconnecting the parallel multi-circuit lines at one or more points, and quick-acting means for selectively opening the two circuit-breaker means at the two ends of a faulty section in the event of a fault in one section, characterized by the fact that both of said circuit-breaker means on the faulty section have arc-suppressing means operative to cause the circuit breaker to open the circuit of the faulty line within such a short period of time that a low-impedance line-to-ground short-circuit simultaneously occurring on two of the phases of one of the lines of the system at practically any point in any section in which a fault may occur, when the system is carrying 40 percent of its maximum load that would permit the switching operation without loss of stability when there is no short-circuit, shall not cause the two ends of the faulty section to change so much, in their relative phase positions, that stability would be jeopardized, the circuit interrupting time being in all cases materially less than 0.5 second.

5. As a means for increasing the stability, the continuity of service and/or the power limits of an electrical system comprising synchronous machines connected through step-up transformers and multi-circuit polyphase transmission lines of such reactance that the power-carrying capacity, with stability, is limited by reactance in the system, the combination, with said system, of sectionalizing means comprising a quick-acting, trip-free circuit-breaker means at each end of each section, means for interconnecting the parallel multi-circuit lines at one or more points, and quick-acting means for selectively opening the two circuit-breaker means at the two ends of a faulty section in the event of a fault in one section, characterized by the fact that both of said circuit-breaker means on the faulty section have arc-suppressing means operative to cause the circuit breaker to open the circuit of the faulty line within such a short period of time that a low-impedance short-circuit on all of the phases of one of the lines of the system at practically any point in any section in which a fault may occur, when the system is carrying 30 per cent of its maximum load that would permit the switching operation without loss of stability when there is no short-circuit, shall not cause the two ends of the faulty section to change so much, in their relative phase positions, that stability would be jeopardized.

6. As a means for increasing the stability, the continuity of service and/or the power limits of an electrical system comprising synchronous machines connected through step-up transformers and multi-circuit polyphase transmission lines of such reactance that the power-carrying capacity, with stability, is limited by reactance in the system, the combination, with said system, of sectionalizing means comprising a quick-acting, trip-free circuit-breaker means at each end of each section, means for interconnecting the parallel multi-circuit lines at one or more points, and quick-acting means for selectively opening the two circuit-breaker means at the two ends of a faulty section in the event of a fault in one section, characterized by the fact that both of said circuit-breaker means on the faulty section have arc-suppressing means operative to cause the circuit breaker to open the circuit of the faulty line within a period of time which is less than one-quarter of the complete natural period of the free electro-mechanical oscillation of the system.

7. As a means for increasing the stability, the continuity of service and/or the power limits of an electrical system comprising polyphase synchronous machines connected through a polyphase power-transmitting line comprising a section equipped with a quick-acting trip-free circuit-breaker means at each end, the combination, with said circuit-breaker means, of quick-acting means for tripping the same in response to a predetermined severity of fault, characterized by the fact that both of said circuit-breaker means on the faulty section have arc-suppressing means operative to cause the circuit breaker to open the circuit of the faulty line within a period of time which is less than one-quarter of the complete natural period of the free electro-mechanical oscillation of the system at the point of fault.

8. The invention, as defined in claim 1, characterized by the fact that at least some of the synchronous machines at a station on the system, totaling at least 50% of the total synchronous machine KVA. at said station, are equipped with quick-response excitation means having an exciter-voltage response of at least 200 volts per second under all normal operating load conditions of the system.

9. As a means for increasing the stability, the continuity of service and/or the power limits of an electrical system comprising polyphase synchronous machines connected through a polyphase power-transmitting line comprising a section equipped with a quick-acting trip-free circuit-breaker means at each end, the combination, with said circuit-breaker means, of quick-acting means for tripping the same in response to a predetermined severity of fault, characterized by the fact that both of said circuit-breaker means on the faulty section have arc-suppressing means operative to cause the circuit breaker to open the circuit of the faulty line within a period of time which is less than one-quarter of the complete natural period of the free electro-mechanical oscillation of the system at the point of fault, and characterized further by having an operative relaying connection between the two ends of a faulty section for simultaneously effecting the quick tripping of the circuit-breaker means at both ends thereof.

10. The invention, as defined in claim 1, characterized by the fact that the quick-acting means for selectively opening the two circuit-breaker means at the two ends of a faulty section comprise an instantaneously operating impedance relay at each end of the section for responding to a decrease in the impedance ratio of voltage to current below a predetermined critical value of said ratio, an instantaneously operating reverse-current relay associated with each impedance relay or group of relays, and means responsive to the operation of any one of said impedance relays and to the position of its associated reverse-current relay for simultaneously tripping the circuit-breaker means at both ends of said faulty section.

11. The invention, as defined in claim 1, characterized by the fact that the quick-acting means for selectively opening the two circuit-breaker means at the two ends of a faulty section comprise an instantaneously operating impedance relay at each end of the section for responding to a decrease in the impedance ratio of voltage to current below a predetermined critical value of said ratio, means for causing said impedance relays to respond substantially to the alternating-current value of the fault-current, regardless of its asymmetric direct-current component, and means responsive to the operation of said impedance relays for quickly tripping the circuit-breaker means.

12. The invention, as defined in claim 1, characterized by the fact that the quick-acting means for selectively opening the two circuit-breaker means at the two ends of a faulty polyphase section comprise, at each end of each section, a plurality of impedance relays responsive, selectively and respectively, to the different possible permutations of line-to-line faults and line-to-ground faults, each relay being operative within approximately one-sixtieth of a second after its setting has been exceeded, each impedance relay comprising current-responsive windings and voltage-responsive windings, each of the current-responsive winding circuits having a large resistance as compared to its reactance and being shunted by a transient impedance shunt having such time constant as to minimize the effect, on the impedance relay, of the asymmetric components of asymmetrical fault currents, an instantaneously operating reverse-current relay associated with each impedance relay or group of relays, and means responsive to the operation of any one of said impedance relays and to the position of its associated reverse-current relay for quickly tripping the circuit-breaker means.

13. As a means for increasing the stability and the power limits of an electrical system comprising synchronous machines connected through a polyphase transmission line comprising a polyphase section equipped, at each end, with a quick-acting trip-free circuit-breaker means operative to clear its line within approximately one-fifth of a second after the application of a tripping current thereto, the combination, with said circuit-breaker means, of a quick-acting means for tripping the same in response to a predetermined severity of fault, said quick-acting fault-responsive tripping means comprising, at each end of said section, a plurality of impedance relays responsive, selectively and respectively, to the different possible permutations of line-to-line faults and line-to-ground faults, each relay being operative within approximately one-sixtieth of a second after its setting has been exceeded, each impedance relay comprising current-responsive windings and voltage-responsive windings, each of the current-responsive circuits having a large resistance as compared to its reactance and being shunted by a transient impedance shunt having such time constant as to minimize the effect, on the impedance relay, of the asymmetric components of asymmetrical fault currents, an instantaneously operating reverse-current relay associated with each impedance relay or group of relays, and means responsive to the operation of any one of said impedance relays and to the position of its associated reverse-current relay for quickly tripping the circuit-breaker means.

14. The invention, as defined in claim 1, characterized by the fact that the quick-acting trip-free circuit-breaker means at each end of each section are at a voltage corresponding to the high-voltage side of the step-up transformers.

15. As a means for increasing the stability and the power limits of an electrical system comprising synchronous machines connected through a transmission line comprising a section equipped with a quick-acting trip-free circuit-breaker means at each end, the combination, with said circuit-breaker means, of quick-acting means for tripping the same in response to a predetermined severity of fault, quick-acting impedance-measuring means operative to respond to the impedance ratio of voltage to current in a faulty section after its circuit-breakers have opened, when said impedance ratio is larger than a predetermined amount, and quick-acting means responsive to the operation of said impedance-measuring means for reclosing said circuit-breakers, characterized further by the fact that the total time of operation, from the occurrence of an arcing type of fault which clears itself, on removal of voltage, until the reconnection of the faulty line into service, is less than the time required for the phase-angle displacement of the two ends of the faulty section to swing to such extent that stability would be jeopardized.

16. As a means for increasing the stability and/or continuity of service of an electrical system comprising synchronous machines and a power-transmitting line comprising a section equipped with a quick-acting trip-free circuit-breaker means at each end, the combination, with said circuit-breaker means, of quick-acting means for tripping the same in response to a predetermined severity of fault, and quick-acting means for reclosing said circuit-breakers, characterized by the fact that the total time of operation, from the occurrence of an arcing type of fault which clears itself, until the reconnection of the faulty line into service, is less than approximately one-quarter of a second.

17. As a means for increasing the stability and the power limits of an electrical system comprising synchronous machines connected through a polyphase transmission line comprising a polyphase section equipped, at each end, with a quick-acting trip-free circuit-breaker means operative to clear its line within approximately one-fifth of a second after the application of a tripping current thereto, the combination, with said circuit-breaker means, of a quick-acting means for tripping the same in response to a predetermined severity of fault, said quick-acting fault-responsive tripping means comprising, at each end of said section, a plurality of impedance relays responsive, selectively and respectively, to the different possible permutations of line-to-line faults and line-to-ground faults, each relay being operative within approximately one-sixtieth of a second after its setting has been exceeded, each impedance relay comprising current-responsive windings and voltage-responsive windings, an instantaneously operating reverse-current relay associated with each impedance relay or group of relays, and means responsive to the operation of any one of said impedance relays and to the position of its associated reverse-current relay for quickly tripping the circuit-breaker means.

18. As a means for increasing the stability and the power limits of an electrical system comprising synchronous machines connected through a polyphase transmission line comprising a polyphase section equipped, at each end, with a quick-acting trip-free circuit-breaker means operative to clear its line within approximately one-fifth of a second after the application of a tripping current thereto, the combination, with said circuit-breaker means, of a quick-acting means for tripping the same in response to a predetermined severity of fault, said quick-acting fault-responsive tripping means comprising, at each end of said section, a fault-distance-responsive relaying means operative within approximately one-sixtieth of a second after its setting has been exceeded, an instantaneously operating reverse-current relay associated with each fault-distance-responsive relaying means, and means responsive to the operation of said fault-distance-responsive relaying means and to the position of its associated reverse-current relay for quickly tripping the circuit-breaker means.

19. As a means for increasing the stability and the power limits of an electrical system comprising synchronous machines connected through a polyphase transmission line comprising a polyphase section equipped, at each end, with a quick-acting trip-free circuit-breaker means operative to clear its line within approximately one-fifth of a second after the application of a tripping current thereto, the combination, with said circuit-breaker means, of a quick-acting means for tripping the same in response to a predetermined severity of fault, said quick-acting fault-responsive tripping means comprising, at each end of said section, a fault-distance-responsive relaying means operative within approximately one-sixtieth of a second after its setting has been exceeded.

20. An alternating-current transmission system comprising synchronous electric machines and a sectionalized power line connecting the same, said line having quick breakers and quick-acting relays, which clear a faulty power-line section before there has been time for a sufficient phase-swing to result in loss of synchronism.

21. An alternating-current transmission system comprising synchronous electric machines and a sectionalized power line connecting the same, said line having quick breakers and quick-acting relays, each breaker and relay being operative to open-circuit its end of the faulty power-line section within approximately one-fifth of a second after the relay setting has been exceeded.

22. The invention as defined in claim 21, characterized by the fact that each of the aforesaid breakers is an oil-immersed circuit-breaker embodying means for making it impossible to close the same in on a fault, and hold it in, even momentarily, and embodying at least the following means for securing a high rate of operation, to wit: means for retaining oil in the vicinity of the arc path and means for moving the arc through, or into close proximity to, the retained oil; and means for specifically controlling the distribution of voltage along said arc path at the moment of current-zero at which the arc is to be interrupted.

23. The invention as defined in claim 21, characterized by the fact that each of the aforesaid breakers is an oil-immersed circuit-breaker embodying means for making it impossible to close the same in on a fault, and hold it in, even momentarily, and embodying at least the following means for securing a high rate of operation, to wit: a construction having at least two serially connected breaks per pole, each break comprising means for retaining oil in the vicinity of the arc path and means for moving the arc through, or into close proximity to, the retained oil, means for specifically controlling the distribution of voltage along said arc path at the moment of current-zero at which the arc is to be interrupted, and means for specifically controlling the division of voltage between the several serially connected breaks of each pole.

24. The invention as defined in claim 21, characterized by the fact that each of the aforesaid breakers is an oil-immersed circuit-breaker embodying means for making it impossible to close the same in on a fault, and hold it in, even momentarily, and embodying at least the following means for securing a high rate of operation, to wit: arc-quenching means comprising a stack of slotted plates of insulating material, interspersed with slotted magnetizable plates, a movable contact-member, and means for moving said movable contact-member transversely of said plates and within said slot for drawing an arc, and graded impedance means connecting said magnetizable plates for specifically controlling the distribution of voltage along the arc within said slot.

25. The invention as defined in claim 21, characterized by the fact that each of the aforesaid breakers is an oil-immersed circuit breaker embodying means for making it impossible to close the same in on a fault, and hold it in, even momentarily, and embodying at least the following means for securing a high rate of operation, to wit: a construction having at least two serially connected breaks per pole, each break comprising arc-quenching means comprising a stack of slotted plates of insulating material, interspersed with slotted magnetizable plates, a movable contact-member, and means for moving said movable contact-member transversely of said plates and within said slot for drawing an arc, and graded impedance means connecting said magnetizable plates for specifically controlling the distribution of voltage along the arc within said slot, and a connection between each graded impedance means and its movable contact-member for specifically controlling the division of voltage between the several serially connected breaks of each pole.

26. The invention as defined in claim 21, characterized by the fact that each of the aforesaid breakers is an oil-immersed circuit-breaker embodying means for making it impossible to close the same in on a fault, and hold it in, even momentarily, and embodying at least the following means for securing a high rate of operation, to wit: means for retaining oil in the vicinity of the arc path and means for moving the arc through, or into close proximity to, the retained oil; and means for causing the movable circuit-breaker contacts to be trip-free within the pole units of the breaker.

27. The invention as defined in claim 21, characterized by the fact that each of the aforesaid breakers is an oil-immersed circuit-breaker embodying means for making it impossible to close the same in on a fault, and hold it in, even momentarily, and embodying at least the following means for securing a high rate of operation, to wit: a multiple-break construction having at least four serially connected breaks per pole, each break comprising means for retaining oil in the vicinity of the arc path and means for moving the arc through, or into close proximity to, the retained oil.

28. The invention as defined in claim 21, characterized by the fact that each of the aforesaid breakers is an oil-immersed circuit-breaker embodying means for making it impossible to close the same in on a fault, and hold it in, even momentarily, and embodying at least the following means for securing a high rate of operation, to wit: a construction having at least two serially connected breaks per pole, each break comprising means for retaining oil in the vicinity of the arc path and means for moving the arc through, or into close proximity to, the retained oil, and means for specifically controlling the division of voltage between the several serially connected breaks of each pole.

29. The invention as defined in claim 21, characterized by the fact that each of the aforesaid breakers is an oil-immersed circuit-breaker embodying means for making it impossible to close the same in on a fault, and hold it in, even momentarily, and embodying at least the following means for securing a high rate of operation, to wit: a multiple-break construction having at least four serially connected breaks per pole; and means for causing the movable circuit-breaker contacts to be trip-free within the pole units of the breaker.

30. The invention as defined in claim 21, characterized by the fact that each of the aforesaid breakers is an oil-immersed circuit-breaker embodying means for making it impossible to close the same in on a fault, and hold it in, even momentarily, and embodying at least the following means for securing a high rate of operation, to wit: a multiple-break construction having at least four serially connected breaks per pole, each break comprising means for specifically controlling the distribution of voltage along its arc path at the moment of current-zero at which the arc is to be interrupted.

31. The invention as defined in claim 21, characterized by the fact that each of the aforesaid breakers is an oil-immersed circuit-breaker embodying means for making it impossible to close the same in on a fault, and hold it in, even momentarily, and embodying at least the following means for securing a high rate of operation, to wit: a multiple-break construction having at least four serially connected breaks per pole, each break comprising means for specifically controlling the division of voltage between the several serially connected breaks of each pole.

32. The invention as defined in claim 21, characterized by the fact that each of the aforesaid breakers is an oil-immersed circuit-breaker embodying means for making it impossible to close the same in on a fault, and hold it in, even momentarily, and embodying at least the following means for securing a high rate of operation, to wit: means for retaining oil in the vicinity of the arc path and means for moving the arc through, or into close proximity to, the retained oil; means for causing the movable circuit-breaker contacts to be trip-free within the pole units of the breaker; and a multiple-break construction having at least four serially connected breaks per pole.

33. The invention as defined in claim 21 characterized by the fact that each of the aforesaid breakers is an oil-immersed circuit-breaker embodying means for making it impossible to close the same in on a fault, and hold it in, even momentarily, and embodying at least the following means for securing a high rate of operation, to wit: means for causing the movable circuit-breaker contacts to be trip-free within the pole units of the breaker; a construction having at least two serially connected breaks per pole, each break comprising means for specifically controlling the distribution of voltage along its arc path at the moment of current-zero at which the arc is to be interrupted, and means for specifically controlling the division of voltage between the several serially connected breaks of each pole.

34. The invention as defined in claim 21, characterized by the fact that each of the aforesaid breakers is an oil-immersed circuit-breaker embodying means for making it impossible to close the same in on a fault, and hold it in, even momentarily, and embodying at least the following means for securing a high rate of operation, to wit: a multiple-break construction having at least four serially connected breaks per pole, each break comprising means for specifically controlling the distribution of voltage along its arc path at the moment of current-zero at which the arc is to be interrupted, and means for specifically controlling the division of voltage between the several serially connected breaks of each pole.

35. The invention as defined in claim 21 characterized by the fact that each of the aforesaid breakers is an oil-immersed circuit-breaker embodying means for making it impossible to close the same in on a fault, and hold it in, even momentarily, and embodying at least the following means for securing a high rate of operation, to wit: means for causing the movable circuit-breaker contacts to be trip-free within the pole units of the breaker; a construction having at least two serially connected breaks per pole, each break comprising means for retaining oil in the vicinity of the arc path and means for moving the arc through, or into close proximity to, the retained oil, means for specifically controlling the distribution of voltage along said arc path at the moment of current-zero at which the arc is to be interrupted, and means for specifically controlling the division of voltage between the several serially connected breaks of each pole.

36. The invention as defined in claim 21, characterized by the fact that each of the aforesaid breakers is an oil-immersed circuit-breaker embodying means for making it impossible to close the same in on a fault, and hold it in, even momentarily, and embodying at least the following means for securing a high rate of operation, to wit: a multiple-break construction having at least four serialy connected breaks per pole, each break comprising means for retaining oil in the vicinity of the arc path and means for moving the arc through, or into close proximity to, the retained oil, means for specifically controlling the distribution of voltage along said arc path at the moment of current-zero at which the arc is to be interrupted, and means for specifically controlling the division of voltage between the several serially connected breaks of each pole.

37. The invention as defined in claim 21, characterized by the fact that each of the aforesaid breakers is an oil-immersed circuit-breaker embodying means for making it impossible to close the same in on a fault, and hold it in, even momentarily, and embodying at least the following means for securing a high rate of operation, to wit: means for causing the movable circuit-breaker contacts to be trip-free within the pole units of the breaker; a multiple-break construction having at least four serially connected breaks per pole, each break comprising means for specifically controlling the distribution of voltage along its arc path at the moment of current-zero at which the arc is to be interrupted, and means for specifically controlling the division of voltage between the several serially connected breaks of each pole.

38. The invention as defined in claim 21, characterized by the fact that each of the aforesaid breakers is an oil-immersed circuit-breaker embodying means for making it impossible to close the same in on a fault, and hold it in, even momentarily, and embodying at least the following means for securing a high rate of operation, to wit: means for causing the movable circuit-breaker contacts to be trip-free within the pole units of the breaker; a multiple-break construction having at least four serially connected breaks per pole, each break comprising means for retaining oil in the vicinity of the arc path and means for moving the arc through, or into close proximity to, the retained oil, means for specifically controlling the distribution of voltage along said arc path at the moment of current-zero at which the arc is to be interrupted, and means for specifically controlling the division of voltage between the several serially connected breaks of each pole.

39. As a means for increasing the stability and/or continuity of service of an electrical system comprising synchronous machines and a power-transmitting line equipped with quick-acting circuit-interrupting means, quick-acting means for actuating said circuit-interrupting means to clear the line in response to a fault thereon, and quick-acting means for restoring said line to service, characterized by the fact that the total time of operation, from the occurrence of an arcing type of fault which clears itself, until the reconnection of the faulty line into service, is less than approximately one-quarter of a second.

40. As a means for increasing the stability and/or continuity of service of an electrical system comprising synchronous machines and a power-transmitting line equipped with quick-acting circuit-interrupting means, quick-acting means for actuating said circuit-interrupting means to clear the line in response to a fault thereon, and quick-acting means for restoring said line to service, characterized by the fact that the total time of opeation is such as to prevent service-interruption.

41. As a means for increasing the stability and/or continuity of service of an electrical system comprising synchronous machines and a power-transmitting line equipped with quick-acting circuit-interrupting means, quick-acting means for actuating said circuit-interrupting means to clear the line in response to a fault thereon, and quick-acting means for restoring said line to service, characterized by the fact that the total time of operation, from the occurrence of an arcing type of fault which clears itself on removal of voltage, until the reconnection of the faulty line into service, is less than the time required for the phase-angle displacement of the two ends of the faulty section to swing to such extent that stability would be jeopardized.

42. As a means for increasing the stability and/or continuity of service of an electrical system comprising synchronous machines and a power-transmitting line equipped with quick-acting circuit-interrupting means, quick-acting means for actuating said circuit-interrupting means to clear the line in response to a predetermined severity of fault, quick-acting impedance-measuring means operative to respond to the impedance ratio of voltage to current in a faulty section after its circuit-breakers have opened, when said impedance ratio is larger than a predetermined amount, and quick-acting means responsive to the operation of said impedance-measuring means for restoring said line to service, characterized by the fact that the total time of operation is such as to prevent service-interruption.

43. As a means for increasing the stability and/or continuity of service of an electrical system comprising synchronous machines and a power-transmitting line equipped with quick-acting circuit-interrupting means, quick-acting means for actuating said circuit-interrupting means to clear the line in response to a predetermined severity of fault, quick-acting impedance-measuring means operative to respond to the impedance ratio of voltage to current in a faulty section after its circuit-breakers have opened, when said impedance ratio is larger than a predetermined amount, and quick-acting means responsive to the operation of said impedance-measuring means for restoring said line to service, characterized by the fact that the total time of operation, from the occurrence of an arcing type of fault which clears itself, until the reconnection of the faulty line into service, is less than approximately one-quarter of a second.

In testimony whereof, we have hereunto subscribed our names this 9 day of October, 1929.

ROBERT D. EVANS.
CHARLES LE G. FORTESCUE.
LESLIE N. CRICHTON.
JOHN B. MacNEILL.
SAMUEL B. GRISCOM.
CHARLES F. WAGNER.